United States Patent [19]

Miller

[11] Patent Number: 5,015,351
[45] Date of Patent: May 14, 1991

[54] METHOD FOR ELECTROCHEMICAL TREATMENT OF POROUS BUILDING MATERIALS, PARTICULARLY FOR DRYING AND RE-ALKALIZATION

[76] Inventor: John B. Miller, Bergtunvn 9b, Oslo 10, Norway

[21] Appl. No.: 364,580

[22] Filed: Jun. 9, 1989

Related U.S. Application Data

[63] Continuation-in-part of Ser. No. 333,300, Apr. 4, 1989, abandoned.

[51] Int. Cl.$^5$ .............................................. B01D 13/02
[52] U.S. Cl. .............................. 204/182.2; 204/180.1; 204/130; 204/299 R
[58] Field of Search ............. 204/182.2, 180.1, 299 R, 204/130

[56] References Cited

U.S. PATENT DOCUMENTS

| | | | |
|---|---|---|---|
| 3,856,646 | 12/1974 | Moraru | 204/180.1 |
| 4,145,270 | 3/1979 | Moraru | 204/182.2 |
| 4,600,486 | 7/1986 | Oppitz | 204/180.1 |

Primary Examiner—John F. Niebling
Assistant Examiner—Arun S. Phasge
Attorney, Agent, or Firm—Schweitzer Cornman & Gross

[57] ABSTRACT

An electro-osmotic dewatering procedure is disclosed for removing water from saturated, porous building materials, such as concrete, brick and the like. A controlled, cyclical voltage is applied to an electrode system, to effect osmotic migration of water from an anode electrode, located within the structure or in contact with it, to a cathode electrode, typically spaced from the structure but in electrical circuit with it. The cycle of operations includes a first energy pulse in a direction to effect osmotic migration, followed by a substantially shorter but definite pulse of reverse polarity to prevent or minimize formation of insulating gas films and/or corrosion products. Transition from the primary pulse to the reverse pulse, and from the reverse pulse to the subsequent primary pulse, is at a controlled rate to permit discharge of stored voltage, as a function of inherent capacitance of the system, and to avoid generation of RFI radiations. For treating reinforced concrete, cycling is preferably controlled automatically, as a function of the monitored passivity or non-passivity of the internal reinforcement, so as to avoid creation of corrosion products. Certain aspects of the invention are applicable to other treatments of reinforced concrete, such as realkalization.

18 Claims, 1 Drawing Sheet

METHOD FOR ELECTROCHEMICAL TREATMENT OF POROUS BUILDING MATERIALS, PARTICULARLY FOR DRYING AND RE-ALKALIZATION

RELATED APPLICATIONS:

This application is a continuation-in-part of my co-pending application Ser. No. 333,300, filed Apr. 4, 1989, now abandoned, in favor of this application.

BACKGROUND AND SUMMARY OF THE INVENTION

Many common building materials, such as concrete, gypsum, brick, certain types of stones, and many insulating materials have a capillary pore system. These pore systems frequently can become filled with water, particularly where the materials are in contact with a moisture source, such as moist soil or the like. In many cases, a long term continuation of such moisture-saturated conditions in the building material provides an undesirable environment and/or the potential for deterioration of the materials.

Known procedures for drying saturated, porous materials have proven to be less than satisfactory. One of the traditional methods is the use of a combination of heating and ventilation. However, not only are such procedures very slow, they also utilize large amounts of energy. Further, there is an attendant risk, with any process utilizing heat, of thermally induced warping and/or cracking of the structure.

Another known technique for eliminating water from porous materials is electro-osmosis. Thus, it is known that the walls of the capillaries in most common building materials are covered with an electrically charged, adsorbed water film, sometimes referred to as an electrical double layer. It has been established that, if such a porous body is subjected to an electrical field, part of the so-called double layer will tend to migrate under the influence of the field. Some of the free liquid in the pores is carried along in this process, which can lead to a significant reduction in the internal moisture content of the porous body.

Notwithstanding the theoretical attractiveness of the electro-osmosis process, there have been serious drawbacks to its use in actual practice. One of the reasons for this is the extremely low efficiency experienced by conventional systems. In this respect, the application of an electric charge to a wall of porous building material typically involves the use of electrodes provided in or installed in the porous material, and connected through the material to a grounding electrode. When the electrodes are polarized, there is a migration of water molecules toward the negative electrode. However, after the system has been in operation for a period of time, the electrodes become covered with coherent films of gas, commonly hydrogen gas at the cathode, and in other cases with oxide, sulfide or other films formed by electrochemical reactions at the electrode surfaces. These films have very high electrical resistance, which leads to a deterioration in the electrical characteristics of the system and results in low operating efficiencies.

Another important problem encountered with conventional electro-osmosis practice arises from the fact that the positively charged electrodes of the system are subject to a high degree of electrolytic corrosion. Where the electrodes are installed especially for the purpose, such corrosion results initially in a reduction in efficiency of the system and, eventually, in complete electrical discontinuity at the electrode. In many cases, however, it is desirable to use the internal reinforcing steel as the positive electrode. In such cases, heavy corrosion of the positive electrode can be significantly degrading to the structure itself.

It has been proposed (for example in Swedish Patent Application No. 86/01888-4, filed Apr. 24, 1986), to utilize bursts of rapidly alternating asymmetrical wave forms in an effort to achieve electro-osmosis. Such a procedure is believed to be altogether impractical, however, because the extremely high rate of cycling causes significant power loading and high RFI radiations.

In accordance with the present invention, a novel and improved system and procedure is provided for carrying out electro-osmotic drying of porous structures in a manner to obviate the problems normally arising from polarization of the electrodes and the concomitant loss of operating efficiency and/or deterioration of the system, or possibly even of the structure itself. The present invention has particular relevance to foundation walls and similar structures. It is particularly useful, for example, in reducing the pore liquid in damp cellar walls. Other structures with which the invention can be usefully employed are concrete water tanks, retaining walls, bridge decks, structural columns, etc. In general, the invention can be usefully employed in connection with any structure of concrete or other porous building material, which is exposed to water and subject to degradation by capillary action.

Certain aspects of the invention are also useful to advantage in the re-alkalization of reinforced concrete that has become acidified through carbonation.

For a more complete understanding of the above and other features and advantage of the invention, reference should be made to the following detailed description of preferred embodiments thereof and to the accompanying drawing.

DESCRIPTION OF PREFERRED EMBODIMENTS OF THE INVENTION

Figure 2:
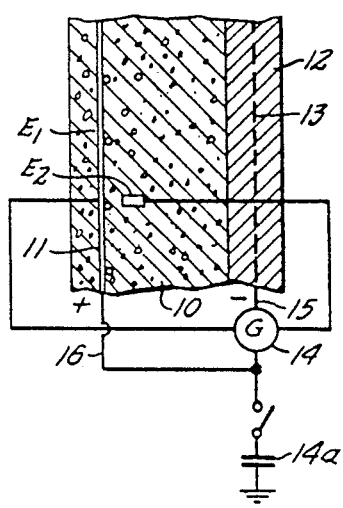
FIGS. 2 and 3 are fragmentary cross sectional representations, illustrating application of a system according to the invention in connection with a typical above-ground structures.

Referring now to the drawing, the reference 10 in FIG. 2 designates a concrete wall structure, which may be reinforced retaining wall or the like, which is exposed to a source of moisture and is likely to become saturated with pore water. In the illustration of FIG. 2, the concrete wall is provided with internal reinforcement 11 of conventional type.

In order to apply electro-osmotic treatment to the wall 10, it is advantageous to employ the internal reinforcing metal as the positive electrode or anode in the system. To provide a complete circuit to a negative electrode, it is advantageous in the illustrated system to apply an electrolytic grout coating, or other suitable porous, conductive coating 12 to an exposed face of the wall 10. The coating 12 of conductive grout typically will include an embedded electrode 13, which may be in the form of a wire grid or the like. A controlled source of voltage 14 is connected through conductors 16 to the respective negative and positive electrodes to enable controlled voltages to be applied to the system, as will be further described.

Figure 1:
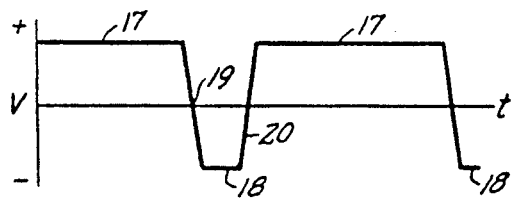
FIG. 1 is a simplified schematic representation of an idealized voltage-versus-time diagram reflecting the operation of an electro-osmotic system in accordance with the invention.

Pursuant to the invention, voltages are applied to the electrodes 11, 13 in the manner reflected in FIG. 1, FIG. 1 being an illustrative voltage-versus-time graphic representation of an operating cycle according to the invention. With reference to FIG. 1, the operating cycle is shown to have two principal phases. In a first principal phase, a DC voltage 17 is impressed upon the electrodes 11, 13, with the internal electrode 11 constituting the anode or positive electrode, and the electrode 13 at the exposed face of the structure 10 constituting the cathode or negative electrode. In the second principal portion of the operating cycle, the voltage is reversed, as at 18, so that the electrodes 11, 13 are of reversed polarity and become the cathode and anode respectively. During the first or principal cycle portion, the voltage pulse 17 causes a current flow in a direction to effect electro-osmotic drying. The second pulse 18, of opposite polarity is imposed periodically in order to prevent or reduce to an acceptable level the formation of gas or other insulating films at the electrodes and/or the formation of corrosion products.

In order to effect electro-osmotic drying, there must be a net energy input in the proper direction over the course of a full cycle. Accordingly, the energy input during the first cycle pulse 17 should be at least twice the energy input during the second cycle portion 18. The ratio of power input during the first cycle portion should in fact be maximized with respect to the power input during the second cycle portion, while avoiding reaching a ratio of such magnitude that the undesirable effects of gas film formation and/or excessive formation of corrosion products will result. Typical experience indicates that energy input ratios of from two to ten times are effective, but in certain cases ratios considerably higher than that can be employed. In a given installation these ratios may be optimized by the use of an oscilloscope to enable circuit output to be monitored during start-up. A microprocessor may also be employed to optimize cycle periods continuously, in order to derive optimum operating efficiencies.

In general, the voltage pulse 17 of the first cycle portion will be equal in magnitude to the voltage pulse 18 of the second cycle portion. Accordingly, the energy input for each cycle portion will be substantially a function of the time duration of the pulse, and the energy ratios will be a function of pulse durations.

In a typical structure to which the process might be applied, such as represented in FIG. 2, the structure itself typically may constitute a rather large capacitance. Accordingly, the procedure according to the invention provides for controlled transition of voltage from positive to negative and reverse. Such controlled transition allows for dissipation of any capacitive charge, and assures that RFI radiation is substantially avoided.

Normally the magnitude of the voltage pulses 17, 18 will be at least 20 volts DC. Theoretically, lower voltages would be operable. However, the time required to realize any significant degree of drying may become excessive. At the upper end of the range, 40 volts DC is a typical maximum. At the high end, the theoretical limit may be much higher than 40 volts. However, as the level of voltage is increased, safety considerations become more significant. Accordingly, for a typical commercial system, voltages in the range of 20–40 volts DC are to be preferred. Desirably, transition from positive to negative (and reverse) is controlled to proceed at a rate of not more than about 8 volts per second, such that the transition periods 19, 20 of FIG. 2 from +40 V to −40 V, or reverse, would approximate 10 seconds or more. These periods can be empirically shortened, if desired, but should be sufficiently controlled to avoid any significant RFI radiations and/or to allow for dissipation of capacitive charge.

The repetition rate of the operating cycle can be varied substantially. Desirably, however, it is as long as practicable in the "positive" direction; that is, the direction in which electro-osmotic elimination of water is effective. In the preferred system, cycling is controlled by monitoring the passivity/non-passivity condition of the reinforcing steel within the concrete. This is accomplished by embedding within the concrete a reference half-cell, such as lead-lead oxide, copper-copper sulphate, silver-silver chloride, etc. The half-cell is located within the concrete, in an area near (within 10–20 mm) to the reinforcing steel (or implanted electrodes, if the porous material does not incorporate reinforcement). Through well known relationships, the half-cell potential is a reflection of the passivated/de-passivated condition of the internal steel. Pursuant to one aspect of the invention, when the half-cell potential indicates that the steel is becoming de-passivated, the potential is reversed, with controlled transition as heretofore mentioned, and a reverse potential is applied and maintained, preferably until the half-cell potential indicates a satisfactory passivated condition of the steel, whereupon the positive potential is reapplied, after the before-mentioned controlled transition.

In certain circumstances, the initial condition of the porous building material may be such that control of the process exclusively by reference to the passivated or depassivated condition of the internal steel would not be productive. In such cases, an override control is applied such that the total of the energy applied (voltage × time) in the "positive" direction, that is, the direction in which the electro-osmotic drying is effective, is at least twice the energy applied in the reverse direction. In a typical situation, the relatively extraordinary circumstances in which it is necessary to override the control of the half-cell electrode are relatively temporary and are ameliorated as the treatment continues. Accordingly, typically, at some point in the treatment process, the system can revert to control by the half-cell electrode.

The time required to effectuate a desirable level of drying of a given structure is a function of many variables, including the size of the structure and the rate at which the structure absorbs water from the environment. In one example, a large, thick foundation of a power plant was dried from a humidity level of 100% (full saturation) to about 80% (substantially dry) in a period of about nine months, utilizing voltage pulses of plus/minus 40 volts DC. For a typical home cellar wall, for example, having a wall thickness of about 300 mm, it is possible to reduce humidity from approximately 100% to approximately 77% in a period of two months, applying plus/minus 40 volts DC. The process can be self-concluding, in the sense that, at humidity levels below 80% the continuity of the pore water becomes uncertain. The electro-osmotic action, in such cases, tends to terminate because of a lack of circuit continuity.

In a typical cellar wall, steel reinforcing is often not provided. In such cases, it is necessary to implant electrode elements in the wall. An advantageous pattern for such electrodes is to provide one electrode approximately every 0.5 m, in a horizontal row about half way up the cellar wall. Usually, it is necessary or desirable to drill into the wall, so that the electrodes may be embedded deeply within the wall.

The primary and reverse voltage pulses preferably will be of the same magnitude. This is not known to be critical, however, and it is contemplated that one of the voltages may be of a different magnitude than the other. In such cases, in order to achieve a predetermined ratio of power input by the primary pulse as compared to power input by the reverse pulse, the time of application of the lower voltage pulse would have to be extended sufficiently to maintain a desired correspondence of the power input ratio.

In the preferred form of the invention, as reflected in FIG. 2 of the drawing, the voltage generating circuit generally designated by the numeral 14 is connected to monitoring electrodes E1, E2. The electrode E1 is connected directly to the reinforcing steel or other embedded electrode within the concrete body, while the electrode E2 represents a half-cell of predetermined composition, preferably lead-lead oxide, because of its relatively low cost.

Pursuant to the invention, a positive voltage is applied to the reinforcing bar 11 to effect electro-osmotic activity within the concrete body 10. As this electro-osmotic activity continues, the reinforcing bars 11 typically will progressively become polarized, eventually to the extent that corrosion of the reinforcing bar will be promoted. As the reinforcing bar becomes progressively polarized, a progressively changing voltage is developed between the electrodes E1, E2. The specific value of the voltage is a function of the composition of the half-cell. However, the contour of the voltage-versus-time curve of the reference cell-to-reinforcing bar voltage (FIG. 7), referred to herein as reference voltage, is quite distinctive and may be utilized to control voltage reversals, preferably utilizing simple microprocessor circuitry. Thus, as can be observed in FIG. 7, when a positive voltage pulse is applied to the electrodes by the external source 14, the reference voltage increases very gradually at first but then rapidly as it approaches the maximum. The reference voltage remains relatively steady for a while before gradually beginning to fall, as indicated at 60 in FIG. 7.

When the reference voltage begins to fall during continuance of the positive voltage pulse from the external power source 14, it indicates that the steel is becoming depassivated to the extent that corrosion will be a problem. The reference voltage reversal is accordingly used to initiate a reverse voltage pulse from the external generator 14.

Figure 7:
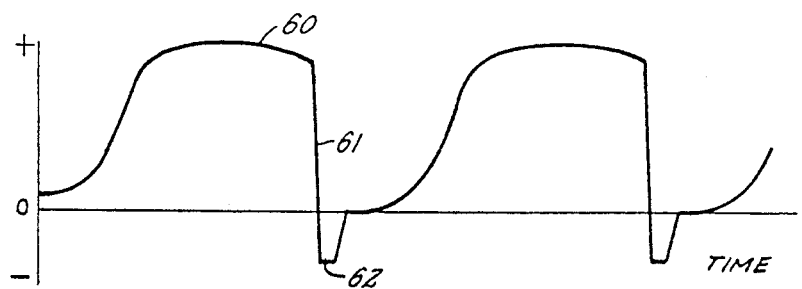
FIG. 7 is a simplified typical voltage-versus-time diagram of a reference voltage cycle resulting from a preferred practice of the invention and which may be employed to control the operation of the electro-osmotic system.

Reversal of the external voltage causes a relatively sharp drop in the reference voltage, as indicated at 61 in FIG. 7, until the reference voltage reaches a negative value. Shortly thereafter, the reference voltage reaches a steady negative value, indicated at 62 in FIG. 7. This condition indicates that the reinforcing steel is becoming depolarized and thus re-passivated. The steady negative voltage thus can be used to trigger resumption of a positive pulse 17 from the external power source 14. This cycle of operations is repeated throughout the treatment process.

The duration of the pulses under the control of the half-cell electrode may vary within extremely wide limits, depending upon such factors as moisture content, electrical conductivity, and the amount and type of oxidizing and reducing substances present within the concrete. In a typical case, a positive pulse might extend for up to an hour, or even a whole day, before the reinforcing steel is polarized to such an extent that corrosion becomes a matter of concern. Pursuant to the invention, this can be automatically controlled by monitoring of the half-cell voltage.

Under some conditions, automatic control solely in accordance with the voltages indicated between the electrodes E1, E2 would produce anomalous results. Where the amount of energy imparted during the positive pulse is not sufficiently greater than that imparted during the negative pulse, the primary objectives of the treatment would be substantially thwarted. Pursuant to the invention, therefore, if the positive energy input pursuant to the half-cell electrode control is less than one-half of the energy input during the negative pulse, control by the half-cell electrode is overridden by time cycle control such that, in any case, positive voltage times its duration is at least twice the negative voltage times its duration.

In general the circumstances in which the automatic control of the half-cell electrode may have to be overridden are as follows:

(a) The concrete or other porous building material contains large amounts of redox substances;
(b) There is a problem of half-cell "poisoning" due to the presence of detrimental substances, molds or bacteria;
(c) disturbing electrical conditions are impressed upon the reinforcing bars, for example, certain types of grounding systems;
(d) A fault occurs within the half-cell control system, because of short circuit, open circuit, etc.

In any of the above circumstances, the process would be governed by a back-up overriding control, to be certain that "positive" energy was at least approximately twice the input of "negative" energy.

In a typical situation, the conditions in which the automatic control of the half-cell electrode would have to be overridden are eliminated during the course of treatment. Accordingly, in a normal case, automatic control under the monitoring of the half-cell electrode system becomes possible at some point fairly early during the overall process of treatment.

Figure 3:
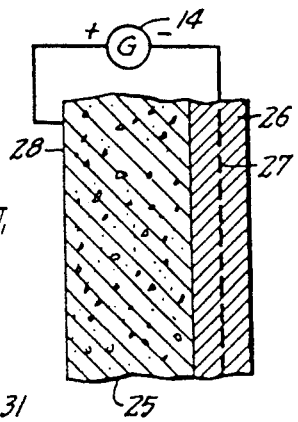

The system of the invention can be applied in a variety of ways to saturated structures. In the illustration of FIG. 3, for example, an above-ground structure 25, which is accessible from both sides, is provided on one side with a porous electrolytic grout material 26 with an embedded electrode 27. The opposite side of the wall is provided with a conductive coating, such as a conductive paint or the like, identified by the reference numeral 28. A programmed, cyclic voltage generator system 14 is connected to the electrodes 27, 28, utilizing the conductive coating 28 as the anode, and the embedded electrode 27 as the cathode. When the system is activated, there will be a electro-osmotic migration of water into the porous coating 26. The coating 26 should be of a sufficiently porous structure that accommodates easy drying by evaporation as the moisture migrates into it from the wall proper.

Figure 4:
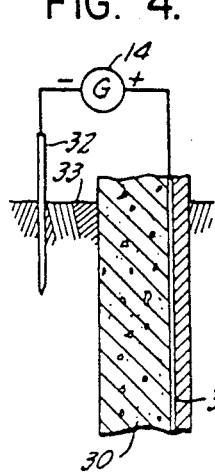
FIGS. 4-6 are fragmentary cross sectional representations illustrating application of the system according to the invention in connection with typical below-ground structures, such as foundations.

In the arrangement of FIG. 4, a below-ground structure, such as a foundation wall 30 is constructed with a system of reinforcing bars 31, which are connected to the programmed voltage generating source 14. One or a plurality of grounding electrodes 32 are driven into the soil 33, adjacent to but spaced from the wall 30, and these grounding electrodes are connected to the negative side of the voltage generating source 14, to serve as the cathode electrode means. In the illustrated arrangement, the system of grounding electrodes 32 is located on the side of the wall 30 most remote from the reinforcing bar system 31, so that the electro-osmotic action applies to a maximum volume of the wall structure.

Figure 5:
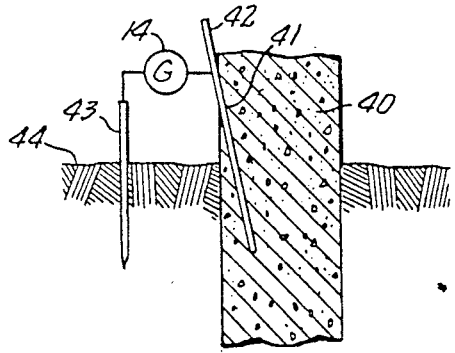

In the below-grade wall structure of FIG. 5, a wall structure 40 has been constructed without internal reinforcement. In such cases, elongated bores 41 are drilled into the wall, at a downwardly inclined angle, and electrode elements 42 are embedded in the bored recesses. A voltage generating system 14 is connected with the positive side to the embedded electrodes 42, and the negative side connected to a grounding electrode system 43 in the form of one or more electrode elements driven into the soil 44. In a typical installation, electrode spacing of 0.5 m has proven to be adequate.

Figure 6:
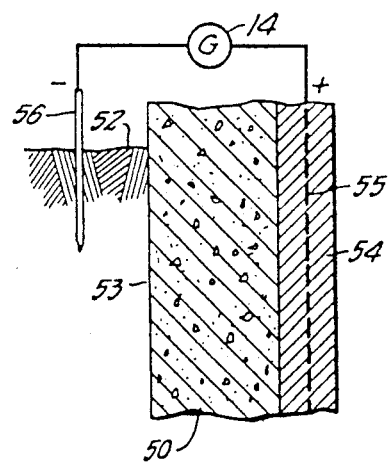

In the structure of FIG. 6, a concrete wall 50, which may be cellar wall or retaining wall, for example, is exposed on one surface 51 and in contact with soil 52 at its opposite surface 53. For such an installation, an electrolytic grout material 54 is advantageously applied to the exposed face 51 of the wall and is provided with an embedded electrode grid or 55, which may, for example, be in the form of a wire mesh. The programmed voltage generating system 14 is connected with its positive side to the grout-embedded electrode 55, and the negative side to a system of grounding electrodes 56 driven into the soil 52.

It will be observed that the arrangement of FIG. 6 differs from that of FIG. 3 in that the connections to the voltage generating system 14 are reversed. In the system of FIG. 6, the electro-osmotic migration of water particles is in the direction of the surrounding earth. In this respect, it will be understood that the references in the several illustrations of FIGS. 2-6 to "+" and "−" refer to the polarity of the principal voltage pulse 17 as illustrated in FIG. 1.

The procedure of the present invention represents a significant advance over known procedures for drying out concrete structures and other structures of porous materials which have become saturated or nearly so with water. Although electro-osmotic processes, in general, have been known, their utilization in a commercial context has not been realized because of practical difficulties involved in the generation of insulating gas films, particularly at the cathode, and the formation of corrosion products at the anode. In the case of the insulating gas film, the process rapidly becomes ineffectual, as the level of resistance rises with the build-up of the gas film. In the case of formation of corrosion products, in addition to introducing significant resistance, or indeed causing electrical discontinuity, the structure being processed can be seriously damaged by weakening of internal reinforcement and/or cracking of the surrounding material by reason of internal pressures built up by expanding corrosion products.

Using the procedure of the present invention, the controlled cyclic reversal of polarity of the energy pulses serves to impede formation of the undesirable gas films and corrosion products, while at the same time enabling a net energy flow to be realized, such that the electro-osmotic processes can proceed at reasonable levels of efficiency and without compromising the integrity of the structure.

Significantly, many of the procedures of the invention are applicable not only to electro-osmotic treatment of porous building materials, but also to treatments such as re-alkalization of the concrete by electro-chemical processes. In the case re-alkalization treatments, it is desired to effect electrolytic migration of the hydroxyl ions from one area, to another area of an existing concrete structure which has been carbonated and thus acidified to a point where serious corrosion of internal reinforcing structure may be imminent. In accordance with techniques disclosed in the copending Miller et al. U.S. application Ser. No. 143,971 (corresponding in subject matter to PCT Publication No. PCT/NO87/00030), rehabilitation of reinforced concrete structures that have suffered an undesirable degree of carbonation can be effected by applying a voltage between spaced electrodes, one located within a relatively carbonated zone of the concrete and the other located either within a relatively uncarbonated zone of the same concrete or embedded within an applied layer of electrolytic material rich in hydroxyl ions. Depending upon the particular configuration of the structure under treatment, reinforcing bars may be subjected to de-pacification or gas film coating. In either case, the controlled treatment process according to the invention, involving controlled reversal of impressed treatment voltage, can be used to great advantage in protecting the internal reinforcing steel against corrosion and/or improving the efficiency of the operation.

In the procedure according to the invention, reversal of polarity is in all cases carried out according to a controlled transition, so that radio frequency interference radiation is effectively avoided, and/or the inherent capacitance of the structure has an opportunity to discharge according to its own rate of discharge, such that polarity reversals do not involve unnecessary expenditures of energy in overcoming opposing residual voltages.

Of particular advantage is the controlling of the process by way of half-cell voltage monitoring, whereby at any stage of the process, the tendency for the internal reinforcing steel (or embedded electrode means, where there is no reinforcing) to become polarized, de-passivated and susceptible of corrosion, the impressed voltage can be reversed, and the reverse voltage pulse maintained until a satisfactory condition of passivity is restored. In a typical case, this procedure enables optimum efficiencies to be achieved, inasmuch as the positive or treatment-giving pulse of electrical energy may be maintained to the greatest possible extent, and periods of reverse polarity may be minimized.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a process for treating moist, porous building materials and the like, wherein positive electrode means are associated with the moist, porous material, negative electrode means are located remotely of and in electrical association with the positive electrode means through at least a portion of the porous material, and a voltage is applied to said electrodes to effect electrolytic action in the region between said electrodes, the improvement characterized by,
   (a) impressing an electro-osmotically effective first voltage on said electrodes for a first portion of an operating cycle,
   (b) thereafter impressing a second voltage of opposite polarity on said electrode means for a second portion of said operating cycle,
   (c) effecting a time-controlled transition from said first voltage to said second voltage where the time rate of voltage change during said transition is such as to substantially avoid r.f.i radiations,
   (d) said first and second voltages and said first and second portions of said operating cycle being so related that energy utilized in said first cycle portion is at least twice that utilized in said second cycle portion, and
   (d) repeating said operating cycle continuously over a period of time to effect a predetermined treatment of said porous material.

2. A process according to claim 1, further characterized by
   (a) said electro-osmotic action comprising electro-osmotic migration of water from the region of one electrode means toward the region of the other electrode means.

3. A process according to claim 1, further characterized by
   (a) said porous building material being reinforced concrete, certain exterior regions of which have become relatively carbonated and acidified,
   (b) one of said electrode means being located in said carbonated exterior region and the other of said electrode means being located in a region of higher alkalinity, and
   (c) said electro-osmotic action comprising electro-osmotic migration of ions from the region of higher alkalinity to the relatively carbonated region to effect a realkalization of said relatively carbonated regions.

4. A process according to claim 1, further characterized by
   (a) controlling the duration of said first and second cycle portions by monitoring the polarization of the positive electrode means,
   (b) changing from said first cycle portion to said second cycle portion when the polarization of said positive electrode means reaches a level conducive to the formation of corrosion products, and
   (c) changing from said second cycle portion to said first cycle portion when the polarization of said positive electrode means has been reduced to a level safely below that which is conducive to the formation of corrosion products.

5. A process according to claim 4, further characterized by
   (a) monitoring the polarization of said positive electrode means by embedding a half-cell reference electrode within the porous material, adjacent said positive electrode means, and measuring the reference voltage between said half-cell and said positive electrode means.

6. A process according to claim 2, further characterized by
   (a) so locating the electrode means and so adjusting the osmotically effective voltage as to achieve an initial current density in the porous material in the range of 0.01 amp/m$^2$ to 1.0 amp/m$^2$.

7. A process according to claim 1, further characterized by
   (a) said first and second voltages being in the range of 20 to 40 volts DC.

8. A process according to claim 1, further characterized by,
   (a) said positive electrode means being embedded in a grout applied externally to said porous material on one side,
   (b) said negative electrode means being positioned on the opposite side of said porous material, whereby a net current flow through the material is realized.

9. A process according to claim 2, further characterized by,
   (a) said porous material comprising a cellar wall or the like,
   (b) said positive electrode means comprising a plurality of individual electrodes embedded in said wall or the like above the bottom thereof and spaced apart approximately 0.5 m.

10. In a process for reducing the moisture content of wet, porous building materials and the like, wherein positive electrode means are associated with the wet porous material, negative electrode means are located externally of the wet porous material and in electrical association with the positive electrode means through at least a portion of the porous material, and a voltage is applied to said electrode means to effect electro-osmotic movement of water from said porous material toward said negative electrode means, the improvement characterized by,
   (a) impressing an electro-osmotically effective first voltage on said electrodes for a first portion of an operating cycle,
   (b) effecting a time-controlled transition from said first voltage to a second voltage of reverse polarity over a sufficiently long period of time such that, during the transition interval, internal capacitance of the electrode-porous material system is discharged, and r.f.i. radiations are effectively avoided,
   (c) impressing said second voltage during a second cycle portion to effect substantial dissipation of insulating gas films and/or corrosion forming products formed at said electrode means, and
   (d) repeating said operating cycle continuously over a period of time to effect a removal of moisture from said porous material.

11. A process according to claim 10, further characterized by,
   (a) monitoring the condition of passivity of said positive electrode means,
   (b) continuing the first cycle portion until said positive electrode means becomes substantially depassivated and subject to corrosion, and (c) thereafter continuing the second cycle portion until said positive electrode means becomes substantially re-passivated.

12. A process according to claim 11, further characterized by,
(a) the energy input of said second cycle portion being limited to not more than about half of the energy input during said first cycle portion regardless of the condition of passivity of said positive electrode.

13. In a process for treating moist reinforced concrete or the like, wherein first electrode means are associated with the moist concrete and second electrode means are spaced from and in electrical association with the first electrode means through at least a portion of the concrete, and wherein at least one of said electrode means comprises steel reinforcement material, and a voltage is applied to said electrode means to effect electrolytic action, in the concrete in the region between said electrode means, the improvement characterized by
(a) impressing a voltage of from about 20 to about 40 volts between said first and second electrode means during a first cycle portion and a voltage within a similar range of magnitudes but of opposite polarity during a second cycle portion,
(b) monitoring the passivity of the electrode means to which a positive voltage is applied during said first cycle portion,
(c) continuing the first cycle portion while the monitored electrode means remains passivated,
(d) discontinuing said first cycle portion and commencing said second cycle portion when the monitored electrode means has become substantially de-passivated and subject to corrosion, and
(e) discontinuing said second cycle portion and commencing said first cycle portion when the monitored electrode means has become substantially re-passivated.

14. A process according to claim 13, further characterized by,
(a) said process of treatment comprising impressing a positive voltage on said steel reinforcement electrode means during said first cycle portion to effect electro-osmotic migration of water toward the other electrode means, and
(b) said other electrode means is located externally of said concrete, to effect migration of said water out of said concrete.

15. A process according to claim 13, further characterized by,
(a) said process of treatment comprising realkalization of said reinforced concrete having regions of higher carbonation and regions of lower carbonation wherein, during said first cycle portion, electro-osmotic migration of hydroxyl ions from regions of higher carbonation electrode to regions of lower carbonation.

16. A process according to claim 13, further characterized by,
(a) the voltage applied during said first cycle portion times the duration thereof being in all cases at least two times the voltage applied during said second cycle portion times the duration thereof.

17. A process according to claim 13, further characterized by,
(a) the reversal of voltage from said first cycle portion to said second cycle portion being effected in accordance with a time-controlled transition at a rate sufficiently slow to accommodate discharge of internal capacitance and/or to avoid significant r.f.i radiation.

18. A process according to claim 13, further characterized by,
(a) the reversal of voltage from said first cycle portion to said second cycle portion being effected at a rate not significantly greater than 8 volts per second.

* * * * *